US009328999B1

(12) United States Patent
Kay

(10) Patent No.: US 9,328,999 B1
(45) Date of Patent: May 3, 2016

(54) LIGHT WEIGHT ROCKET PROPELLED GRENADE NET PROTECTION SYSTEM AND MANUFACTURING PROCESS

(71) Applicant: Richard N. Kay, Nashua, NH (US)

(72) Inventor: Richard N. Kay, Nashua, NH (US)

(\*) Notice: Subject to any disclaimer, the term of this patent is extended or adjusted under 35 U.S.C. 154(b) by 0 days.

(21) Appl. No.: 14/805,652

(22) Filed: Jul. 22, 2015

Related U.S. Application Data

(60) Provisional application No. 62/078,660, filed on Nov. 12, 2014.

(51) Int. Cl.
*F41H 5/013* (2006.01)
*F41H 5/06* (2006.01)
*F41H 5/02* (2006.01)
*B29C 65/08* (2006.01)
*B29K 69/00* (2006.01)
*B29L 28/00* (2006.01)

(52) U.S. Cl.
CPC ............... *F41H 5/026* (2013.01); *B29C 65/08* (2013.01); *F41H 5/06* (2013.01); *B29K 2069/00* (2013.01); *B29L 2028/00* (2013.01)

(58) Field of Classification Search
CPC ........... F41H 5/013; F41H 5/026; F41H 5/06; B29C 65/08; B29L 2028/00
See application file for complete search history.

(56) References Cited

U.S. PATENT DOCUMENTS

| | | | | |
|---|---|---|---|---|
| 1,055,489 | A * | 3/1913 | Pendery | E06B 9/52 160/380 |
| 5,179,244 | A * | 1/1993 | Zufle | B32B 7/02 428/113 |
| 5,188,040 | A * | 2/1993 | Doring | E06B 5/11 109/49.5 |
| 5,370,035 | A * | 12/1994 | Madden, Jr. | B60R 21/12 109/49.5 |
| 6,112,635 | A * | 9/2000 | Cohen | F41H 5/0414 428/911 |
| 7,866,250 | B2 | 1/2011 | Farinella et al. | |
| 7,900,548 | B2 | 3/2011 | Hoadley et al. | |
| 8,011,285 | B2 | 9/2011 | Farinella et al. | |
| 8,245,620 | B2 | 8/2012 | Farinella et al. | |
| 8,245,621 | B2 | 8/2012 | Farinella et al. | |
| 8,245,622 | B2 | 8/2012 | Farinella et al. | |
| 8,443,709 | B2 | 5/2013 | Farinella et al. | |
| 8,453,552 | B2 | 6/2013 | Farinella et al. | |
| 8,464,627 | B2 | 6/2013 | Farinella et al. | |
| 8,468,927 | B2 | 6/2013 | Malone et al. | |
| 8,607,685 | B2 | 12/2013 | Farinella et al. | |
| 8,615,851 | B2 | 12/2013 | Holmes, Jr. et al. | |
| 8,677,882 | B2 | 3/2014 | Shackelford et al. | |
| 8,733,225 | B1 | 5/2014 | Farinella et al. | |
| 8,783,156 | B1 | 7/2014 | Malone et al. | |
| 8,813,631 | B1 | 8/2014 | Shackelford et al. | |
| 8,910,349 | B1 | 12/2014 | Holmes, Jr. et al. | |
| 9,052,167 | B2 | 6/2015 | Farinella et al. | |
| 2005/0132873 | A1 * | 6/2005 | Diaz Supisiche | F41H 5/013 89/36.01 |
| 2009/0205166 | A1 * | 8/2009 | Murray | A47H 23/01 16/221 |
| 2010/0288114 | A1 * | 11/2010 | Soukos | F41H 5/026 89/36.02 |
| 2011/0168001 | A1 * | 7/2011 | Lee | F41H 7/04 89/36.02 |
| 2011/0168003 | A1 * | 7/2011 | Kim | F41H 1/02 89/36.02 |

\* cited by examiner

*Primary Examiner* — Bret Hayes
(74) *Attorney, Agent, or Firm* — Cesari and McKenna, LLP

(57) ABSTRACT

An improved system for protecting vehicles or other objects from rocket propelled grenade (RPG) attacks. A net panel of the improved system weighs and costs substantially less than a conventional protective system panel, and requires minimal manual work to manufacture, install, replace or repair. When assembled, the hard points, as well as the panels, are symmetrical meaning that a panel does not have a left, right, inward or outward face and may be used on either side of a vehicle. The net may be manufactured as a continuous web or roll and does not require any edging for securing it to a frame. In addition, a damaged net may be replaced easily and rapidly using a simple hand tool.

16 Claims, 6 Drawing Sheets

LIGHT WEIGHT ROCKET PROPELLED GRENADE NET PROTECTION SYSTEM AND MANUFACTURING PROCESS

The present application claims priority from a provisional application of common title, inventorship and ownership. That provisional application was filed on Nov. 12, 2014, application No. 62/078,660, and it is incorporated herein by reference.

BACKGROUND OF THE INVENTION

1. Field of the Invention

The present invention relates generally to an improved system for protecting vehicles or other objects from a rocket propelled grenade (RPG) attack.

2. Background Information

Within the past few years, in response to military demand for improved protection of vehicles against rocket propelled grenade (RPG) attacks, at least one manufacturer developed a protective system. The system is based on metal-framed panels of nets which may be attached to a vehicle's exterior to effectively cover all or most of the chassis. Each panel is attached such that it is spaced away from the chassis by a certain distance. The net of each panel includes hard points which are secured to the intersections of the net's filaments. Essentially, if an RPG is fired at the vehicle and strikes the net, the accompanying deformation of the net causes one or more adjacent hard points to move laterally and contact the RPG's nose cone. This contact occurs with sufficient force to destroy the RPG's fuse or otherwise interfere with detonation.

While the conventional system discussed above is believed to be generally effective, it exhibits certain disadvantages. First, the hard points, which are formed from two metal pieces, are attached to the net by hand. This process is slow, costly, and incompatible with injection molding or other automated manufacturing techniques.

Second, due to the number of metallic hard points needed to fully protect a large vehicle, as well as the metal frames of the panels, the conventional system adds substantial weight to the vehicle. Such additional weight adversely affects vehicle performance while also increasing operating and maintenance costs for the vehicle.

Third, when fully assembled, the hard points of the conventional system are asymmetrical in shape. That is, one side of the hard points is intended to face outwardly from the chassis of the vehicle, and the other side is intended to face inwardly toward the chassis. Due to such asymmetry, a panel which is made for a left side of a vehicle typically cannot be used on the right side and vice versa. This asymmetry essentially doubles the number of panels needed in inventory for spares and replacements. It also likely frustrates personnel in the field as it prevents replacing a lost or damaged panel with an available panel that is the made for the opposite side of the vehicle.

Fourth, to enable the net to be attached to its metal frame, the conventional system includes a canvass edging which is hand sewn to the perimeter of the net. The canvass edging is lashed or otherwise attached to the frame. This process is slow and costly, and effectively prevents the replacement of a damaged net separate from the frame. If either a net or frame is damaged, the entire panel must be detached from the vehicle and replaced. This represents a time-consuming process which may be extremely difficult or dangerous to carry out except at a secure, well equipped maintenance facility.

SUMMARY OF THE INVENTION

In brief summary, the present invention provides an improved system for protecting vehicles or other objects from RPG attacks. The panels of the improved system weigh and cost substantially less than a conventional protective system, and require minimal manual work to manufacture, install, replace or repair. When assembled, the hard points, as well as the panels, may be symmetrical meaning that a panel does not have a left, right, inward or outward face and may be used on either side of the vehicle.

Some of the weight and cost savings provided by the present invention is achieved by forming the hard points from a non-metallic material such as polycarbonate. Polycarbonate is lightweight and characterized by a high impact resistance. In addition, polycarbonate is compatible with automated manufacturing techniques such as ultrasonic welding, which enables much more rapid and lower cost manufacturing of the panels. In turn, such automated manufacturing compatibility enables manufacture of a net, with hard points attached, in the form of a web or roll from which desired sizes may be cut. In the event that polycarbonate alone provides insufficient hard point weight for the requirements of a particular application, an insert made of metal or other material may be overmolded.

Additional weight reduction is achieved by using a molded clamp made of high impact polypropylene plastic that attaches the net to the frame already attached to the vehicle. The clamp utilizes a "living hinge" that allows it to open and accept a row or column of hard points that are set in pre-molded cavities and then snaps over the tubular frame locking both the hard points and the net into position. This technique eliminates the need of canvass edging, straps, hook and loop materials that are currently sewn onto the net.

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
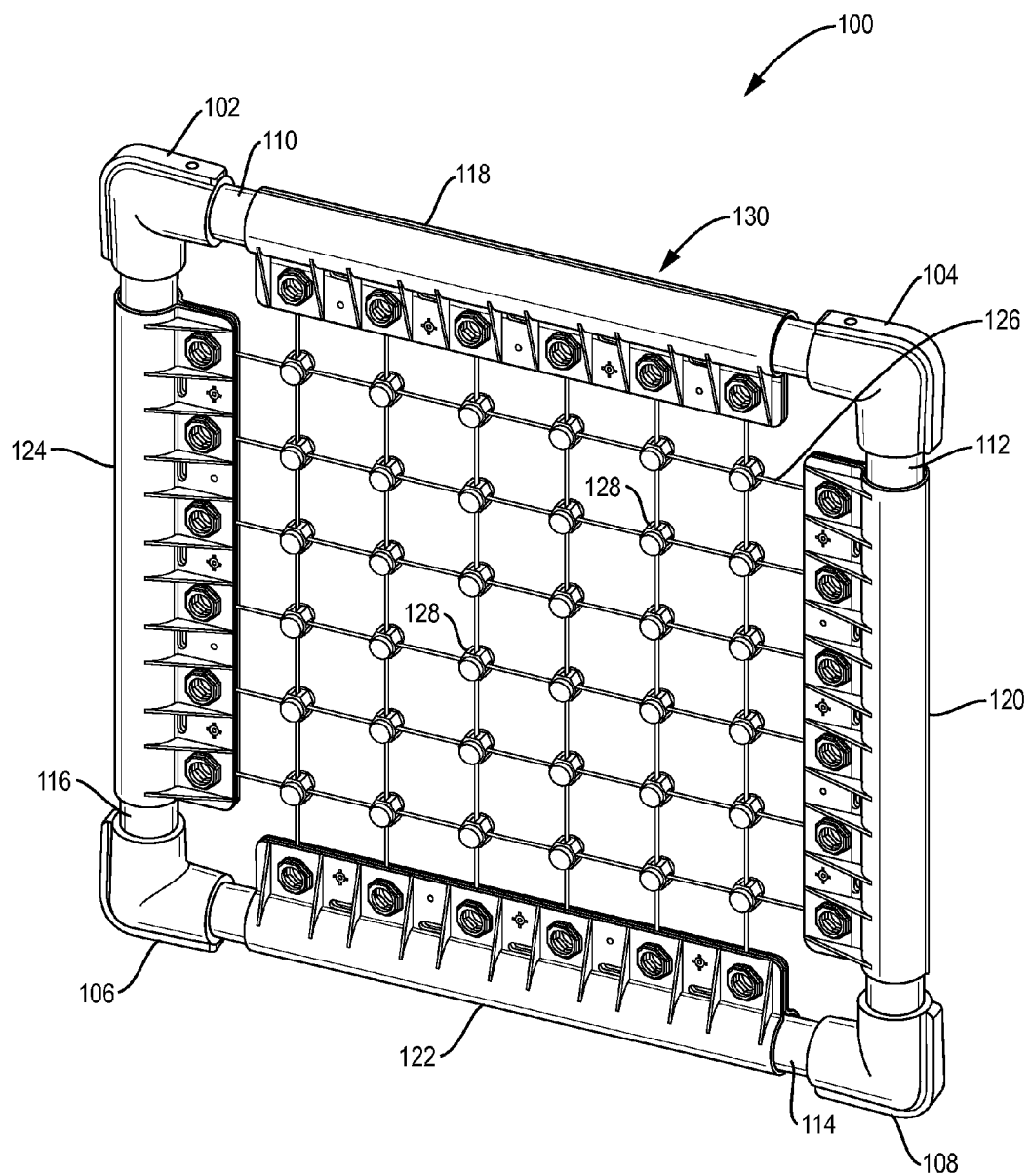
FIG. 1 is a perspective view of an assembled panel, including a net with hard points secured at the intersections of the net's filaments, for use with an improved RPG protective system constructed in accordance with an embodiment of the present invention.

FIG. 1 shows a panel 100 which may be used to protect a vehicle or other object (not shown) from an RPG attack. While panel 100 is depicted as rectangular, the overall shape of panel 100 may be varied to match a corresponding portion of a vehicle's chassis or to meet the requirements of a particular application. Panel 100 includes a frame 130 formed primarily by four corners 102, 104, 106, 108, and four tubes 110, 112, 114 and 116 which are secured to the corners. Each of tubes 110, 112, 114, 116 is jacketed, respectively, by a hinged clamp 118, 120, 122, and 124. A net 126, which spans the area within frame 100 is attached to clamps 118, 120, 122, and 124. A hard point 128 is fixed at each intersection of the filaments of net 126.

As discussed in detail below, each of clamps 118, 120, 122, and 124 includes apertures which are adapted to receive a row or column of hard points 128. By opening each clamp 118, 120, 122, and 124, seating a row or column of hard points 128 in the corresponding apertures, then closing the clamp, net 126 is securely fastened to frame 100. Further, in the event net 126 is damaged or otherwise in need of replacement, the net may be removed and replaced without replacing the clamp or the frame.

Clamps 118, 120, 122, and 124 may be constructed from a variety of high impact thermoplastics such as polypropylene. In addition to reducing weight, plastics do not corrode and are durable in harsh environments. Net 126 may be constructed from Kevlar® or other appropriate materials. Hard points 128 may be constructed from polycarbonate material as described below.

Figure 2:
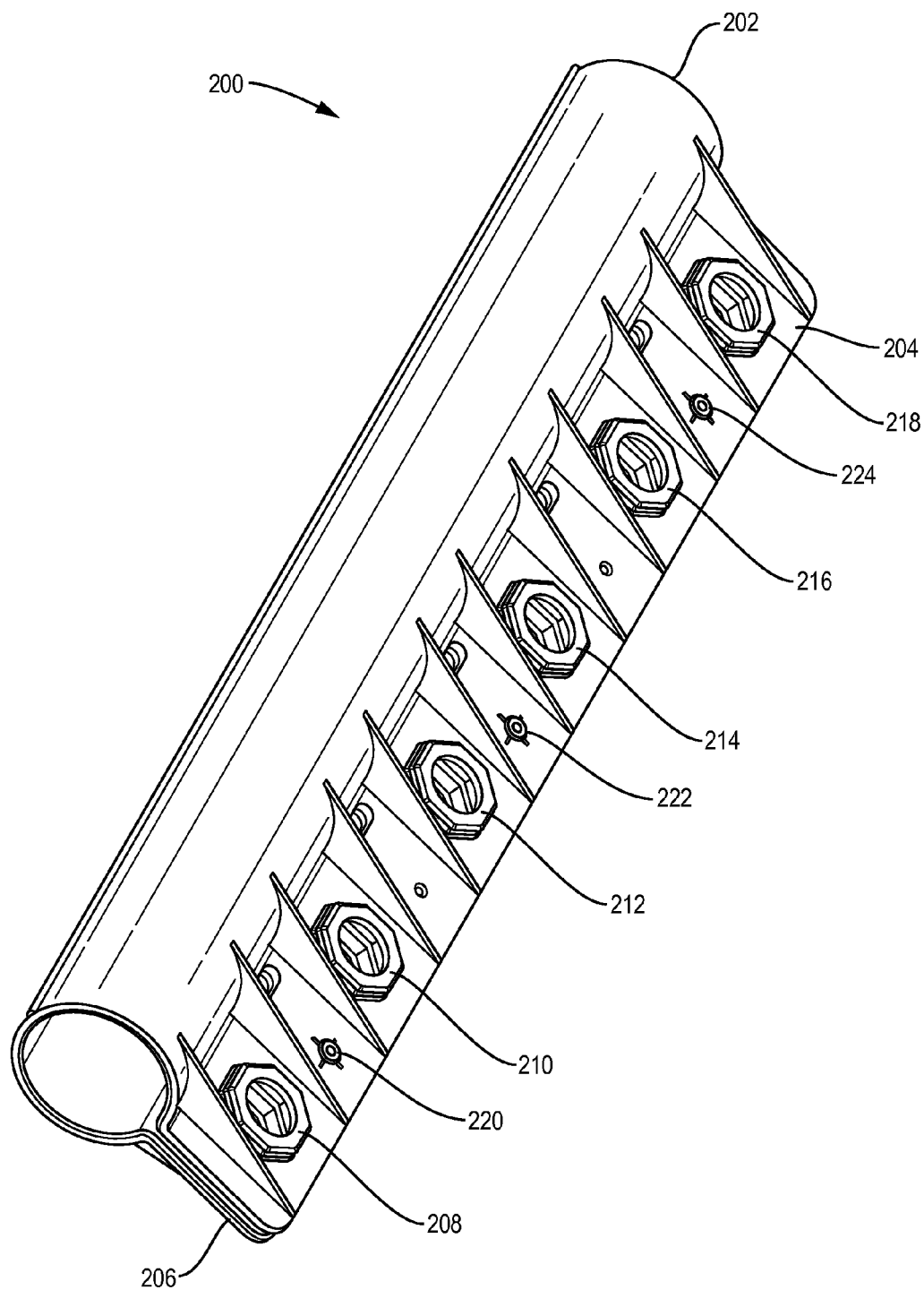
FIG. 2 is a perspective view of the net clamp, in a closed position, which is attached to each side of the panel shown in FIG. 1.

FIG. 2 is an enlarged, perspective view of a clamp 200 like those shown in FIG. 1. A living hinge 202 is dimensioned to tightly fit a tube (omitted for greater clarity) when clamp 200 is closed. Two flanges 204, 206 are integrally formed with living hinge 202. Flanges 204, 206 each have a series of apertures 208, 210, 212, 214, 216, 218 which are substantially aligned when clamp 200 is closed. Apertures 208, 210, 212, 214, 216, 218 are shaped and dimensioned to securely hold a row or column of hard points 128 (FIG. 1) which are attached to net 126. Snaps 220, 222 and 224 serve to lock clamp 200 in a closed position. Snaps 220, 222 and 224 are friction engaged and may be disengaged by a simple hand tool.

Figure 3:
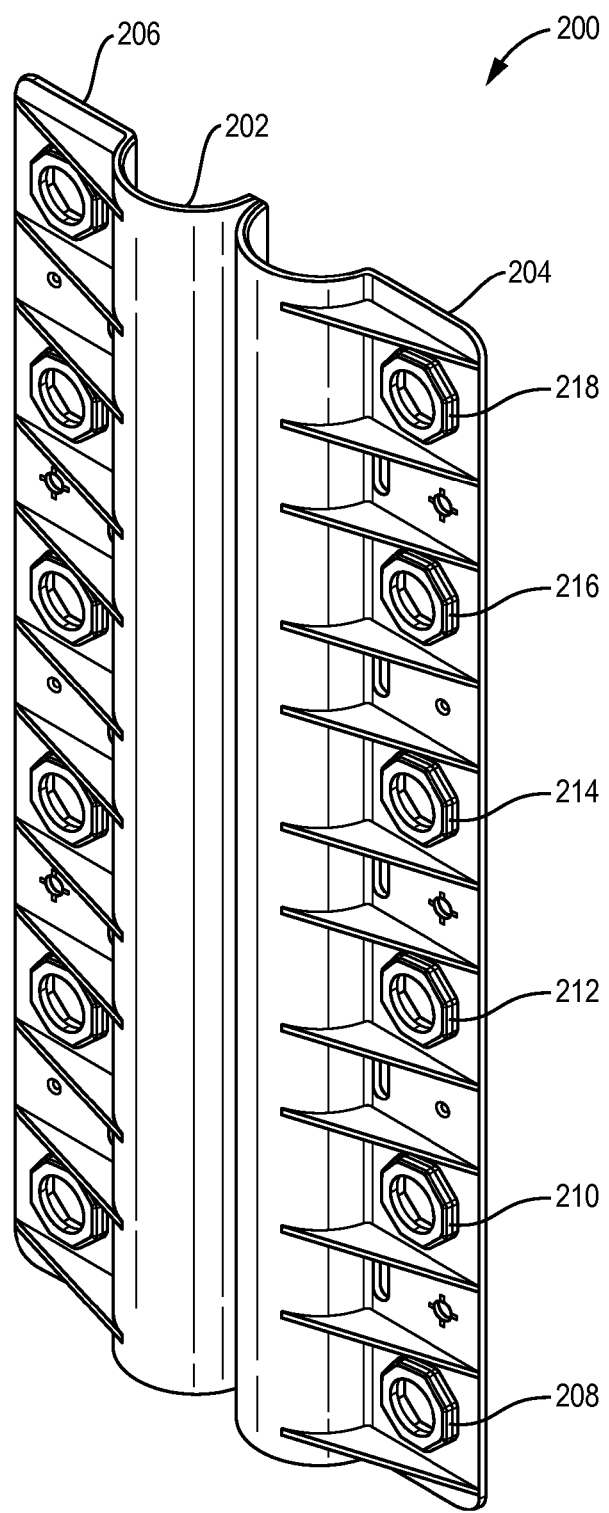
FIG. 3 is a perspective view of the clamp structure of FIG. 2 in an open position.

FIG. 3 shows clamp 200 of FIG. 2 in an open position. By opening clamp 200, assembly of panel 100 is facilitated. Initially, with clamp 200 open, an associated tube 110, 112, 114, 116 (FIG. 1) may be easily placed in living hinge 202. In addition, open clamp 200 allows for a row or column of hard points 128 (not shown) to be seated, respectively, in apertures 208, 210, 212, 214, 216, 218 in one of flanges 204, 206. Once the hard points are seated, clamp 200 may be closed and locked with snaps 220, 222 and 224. In this fashion, clamp 200 effectively secures net 126 to frame 100 without the need for a canvass edging.

Figure 4:
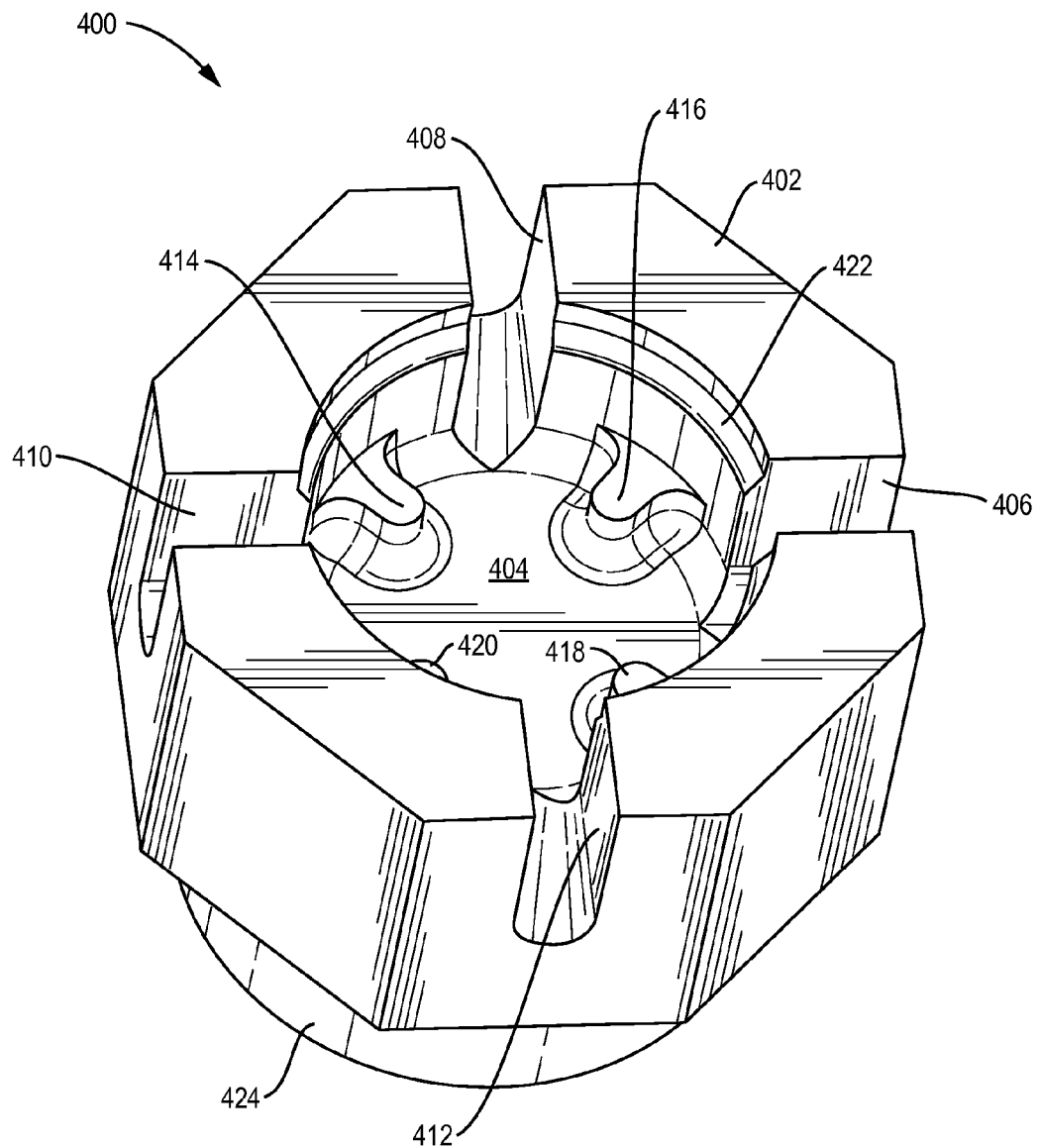
FIG. 4 is a perspective view of the internal web configuration that is molded into the hard point base to center the filament within the hard point during assembly and welding operations.

FIG. 4 shows a hard point base 400, one of two mating pieces which when joined together form a hard point 128. An upper portion 402 of hard point base 400 is octagonal in shape with a central cavity 404. Cavity 404 is intersected by four channels 406, 408, 410, 412, each of which is shaped and dimensioned to accommodate a filament of net 126 (omitted for clarity). The bottom of cavity 404 includes four integral bosses 414, 416, 418, 420 which serve to limit lateral movement of the net filaments after the hard point has been secured to the net.

A chamfered sidewall 422 of cavity 404 provides a stop for a second piece (not shown) which is a mate to hard point base 400. A portion 424 of hard point base 400 is substantially cylindrical.

Figure 5:
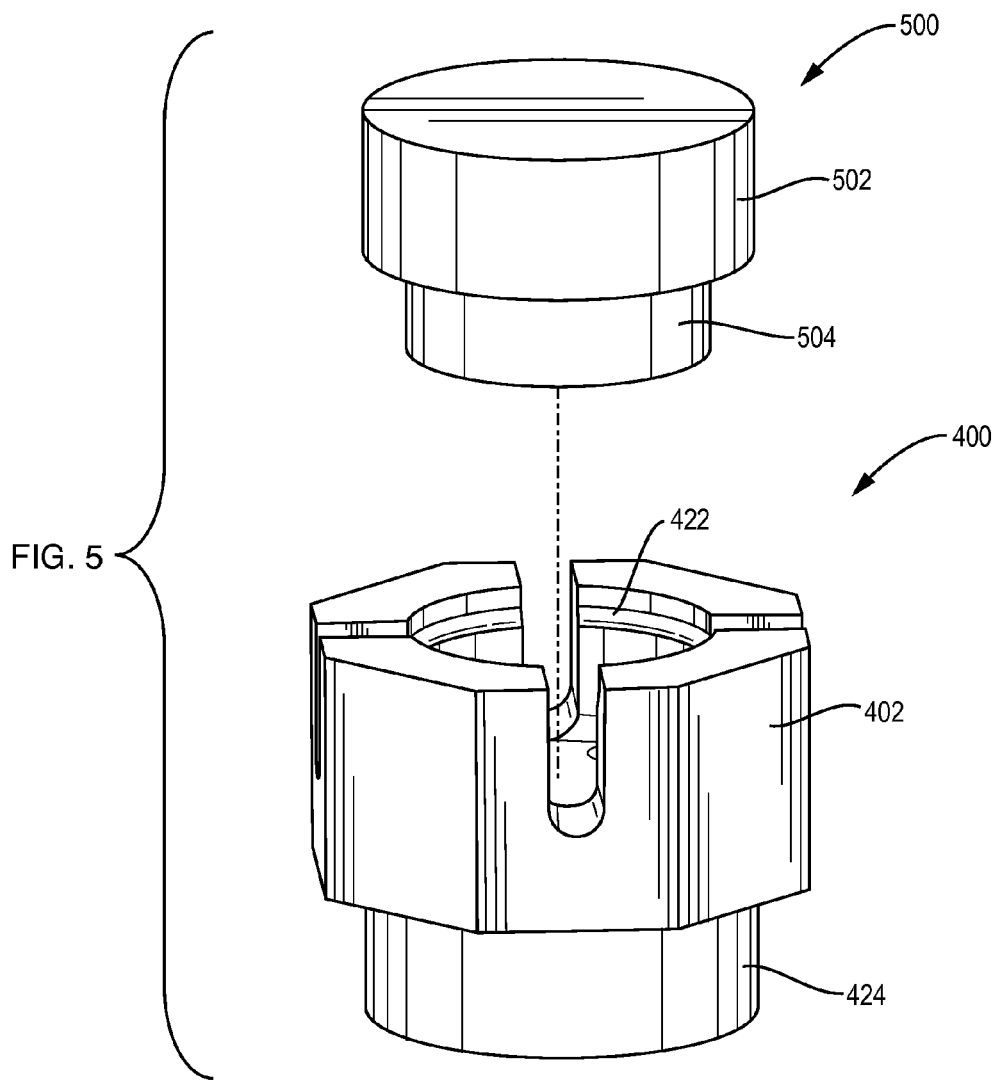
FIG. 5 is an elevation view of two mating pieces prior to being joined to form a hard point.
Figure 6:
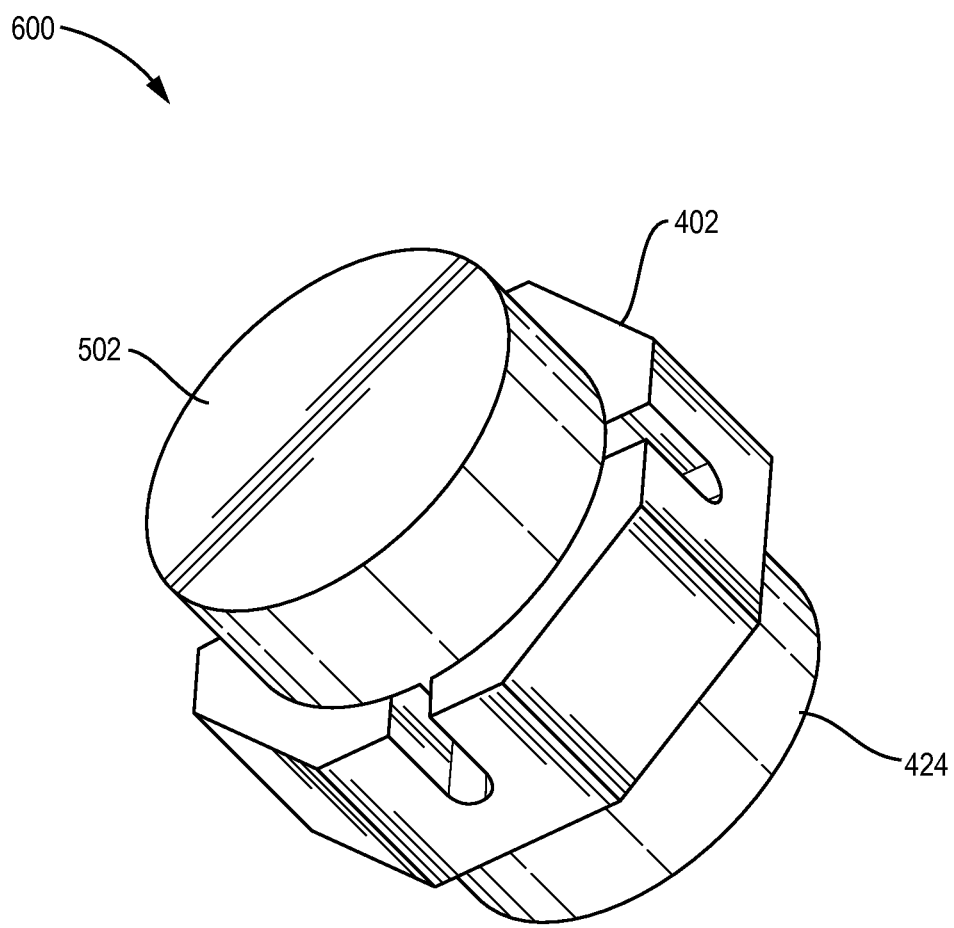
FIG. 6 is a perspective view of an assembled, symmetrical hard point.

FIG. 5 shows a hard point cap 500 which is a mate to hard point base 400. A portion 502 of second hard point piece 500 is substantially the same size and shape as portion 424 of hard point base 400. A portion 504 of hard point cap 500 is shaped and dimensioned to mate with cavity 404 and engage chamfered sidewall 422. When hard point base 400 and hard point cap 500 are joined together, they form a symmetrical hard point 600 as shown in FIG. 6. With such hard point symmetry, an assembled panel 100 (FIG. 1) does not have a left, right, inward or outward face and may be used on either side of a vehicle.

Hard point base 400 and hard point cap 500 may be formed of a polycarbonate material whose advantages include light weight and compatibility with ultrasonic welding. Other such manufacturing practices include thermoforming hard points directly onto a pre-cut net shape or a continuous roll eliminating the need of ultrasonic welding. Such compatibility enables manufacture of a continuous web or roll of net, with hard points attached, which may then be cut to size for a desired panel. In addition, if the desired weight of an assembled hard point is greater than the weight of the polycarbonate material alone, it is possible to overmold an insert made of metal or other suitable material. Fillers such as fiberglass, carbon fiber and the like could be added to the base material to change the physical properties of the hard points. Other such families of thermoplastic materials that could be used to manufacture hard points would include High Density Themoplastics.

What is claimed is:

1. A panel for a system for protecting a vehicle from a rocket propelled grenade (RPG) attack, the panel comprising:
   a net which includes a plurality of intersecting filaments, said net having an edge which is removably attached to a plurality of hinged clamps, each of said plurality of hinged clamps arranged to jacket a portion of a frame, each of said plurality of hinged clamps including a plurality of apertures;
   said panel being shaped and dimensioned to protect at least one portion of a vehicle when installed in a predetermined spaced relationship on said vehicle; and
   a plurality of hard points each of which is located at a different intersection of said intersecting filaments, each of said hard points assembled by ultrasonically welding two mating pieces of polycarbonate material which when joined form a symmetrical hard point secured to said net, at least one row or column of said hard points located along said edge being removably secured within said plurality of apertures of one of said plurality of hinged clamps, thereby securing said net to said frame.

2. The system as in claim 1 wherein one or more of said plurality of hinged clamps is locked and unlocked by a plurality of snaps.

3. The panel as in claim 1 wherein said frame includes a plurality of tubes, each of said plurality of tubes shaped and dimensioned to fit within a hinge of one of said plurality of hinged clamps.

4. The panel as in claim 1 wherein a first one of said two mating pieces of polycarbonate material is formed with a central cavity and four channels, said channels shaped and dimensioned to accommodate portions of first and second filaments of said plurality of filaments.

5. The panel as in claim 4 wherein said central cavity includes four integral bosses which limit lateral movement of said portions of first and second filaments.

6. The panel as in claim 4 wherein said central cavity includes a chamfered sidewall which provides a stop for a second one of said two mating pieces of polycarbonate material.

7. The panel as in claim 1 wherein said panel is symmetrical.

8. The panel as in claim 1 wherein said plurality of hinged clamps are formed from high impact polypropylene plastic.

9. A method for manufacturing a panel for a system for protecting a vehicle from a rocket propelled grenade (RPG) attack, the method comprising the steps of:
   forming a net by arranging a plurality of filaments such that said filaments form a plurality of intersections;

at each of said intersections securing a symmetrical hard point to said net, each said symmetrical hard point formed by joining two mating pieces of polycarbonate material by ultrasonic welding;

forming a frame of a predetermined size;

attaching a plurality of hinged clamps to said frame, each of hinged clamps including apertures which are shaped and dimensioned to accept a row or column of said hard points; and using said hinged clamps to secure said net to said frame.

10. The method as in claim 9 wherein said frame is formed by connecting a plurality of tubes, each of said plurality of tubes shaped and dimensioned to fit within a hinge of one of said plurality of hinged clamps.

11. The method as in claim 9 wherein each of said plurality of hinged clamps, once attached to said frame, is locked in a closed position by one or more snaps.

12. The method as in claim 9 wherein a first one of said two mating pieces of polycarbonate material is formed with a central cavity and four channels, said channels shaped and dimensioned to accommodate portions of first and second filaments of said plurality of filaments.

13. The method as in claim 12 wherein said central cavity is formed with four integral bosses which limit lateral movement of said portions of first and second filaments.

14. The method as in claim 12 wherein said central cavity is formed with a chamfered sidewall which provides a stop for a second one of said two mating pieces of polycarbonate material.

15. The method as in claim 9 wherein said panel is formed symmetrically.

16. The method as in claim 9 wherein said plurality of hinged clamps are formed from high impact polypropylene plastic.

* * * * *